June 28, 1932. B. S. SNOW 1,864,866
WATER TREATING AND STORAGE APPARATUS
Filed April 24, 1929 4 Sheets-Sheet 1
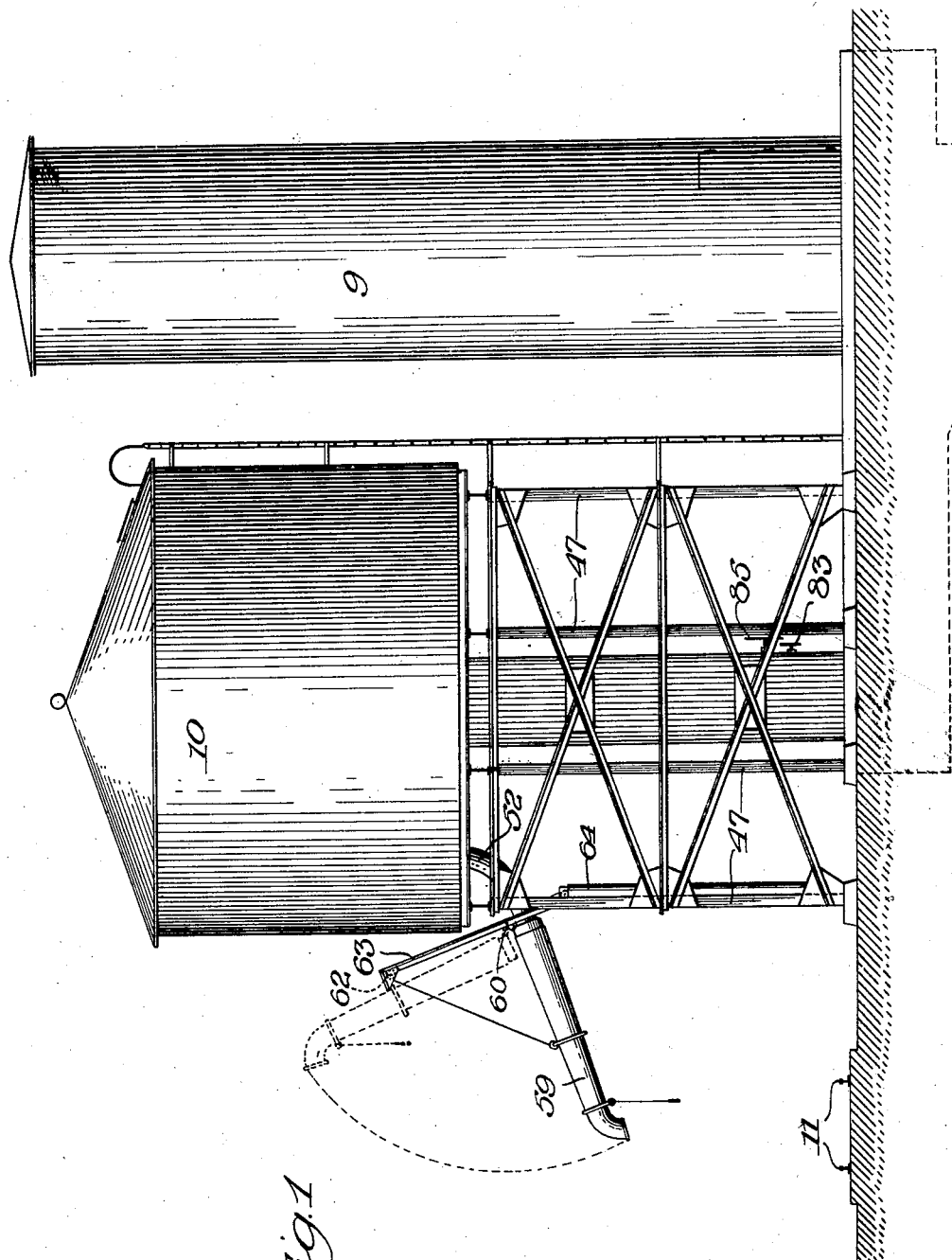

June 28, 1932. B. S. SNOW 1,864,866
WATER TREATING AND STORAGE APPARATUS
Filed April 24, 1929 4 Sheets-Sheet 2
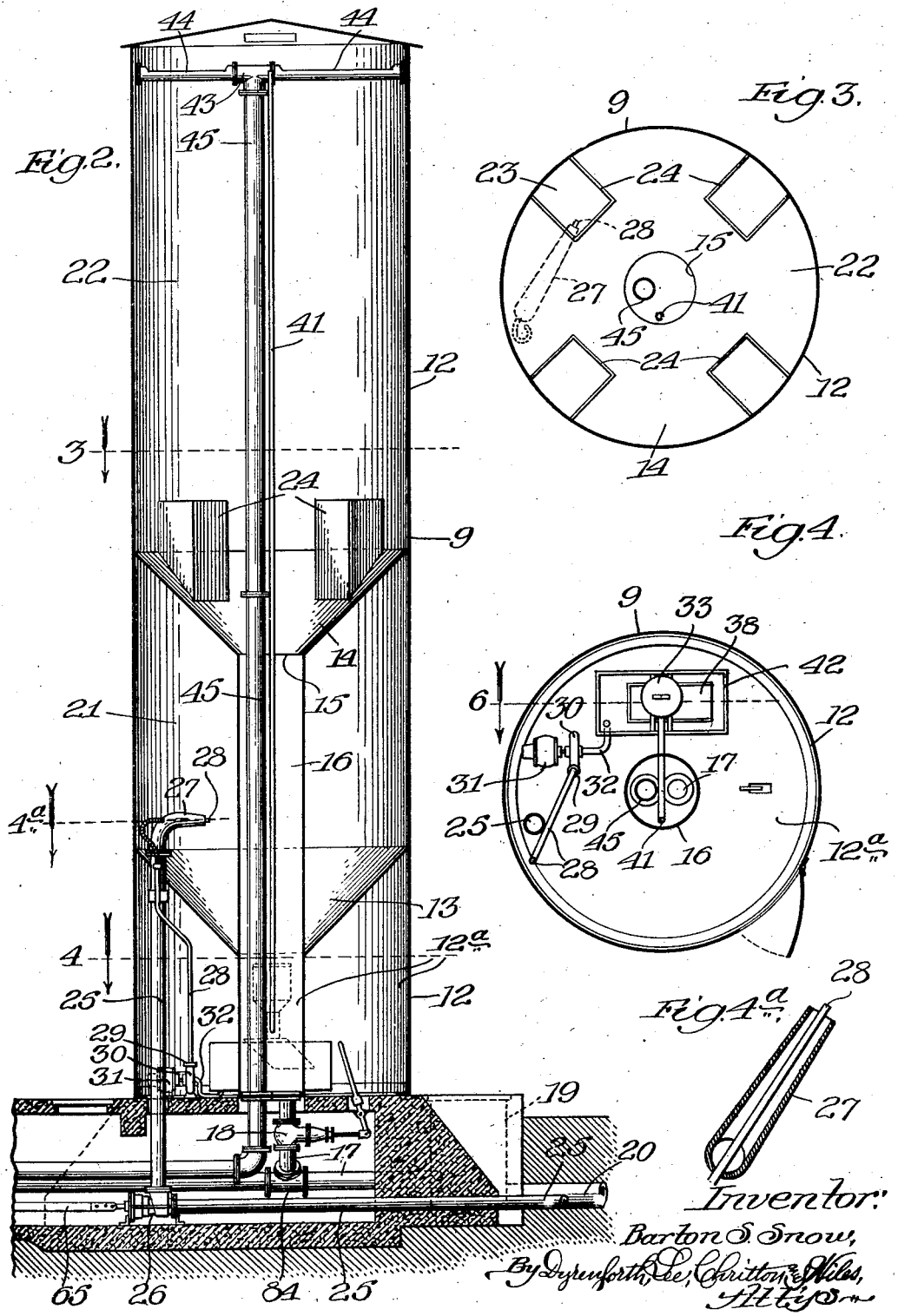
Inventor:
Barton S. Snow,
By Dyrenforth, Lee, Chritton & Wiles,
Attys

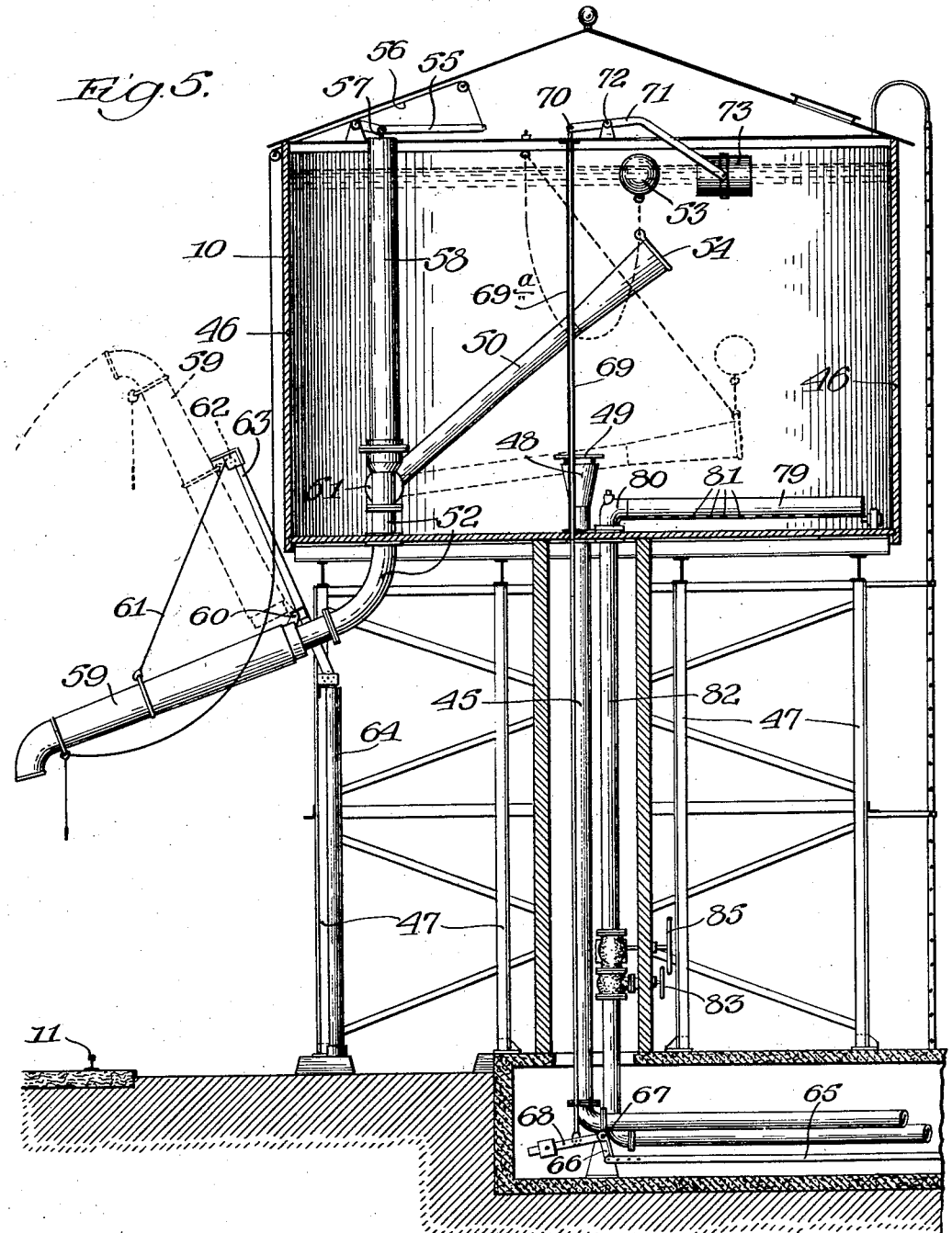

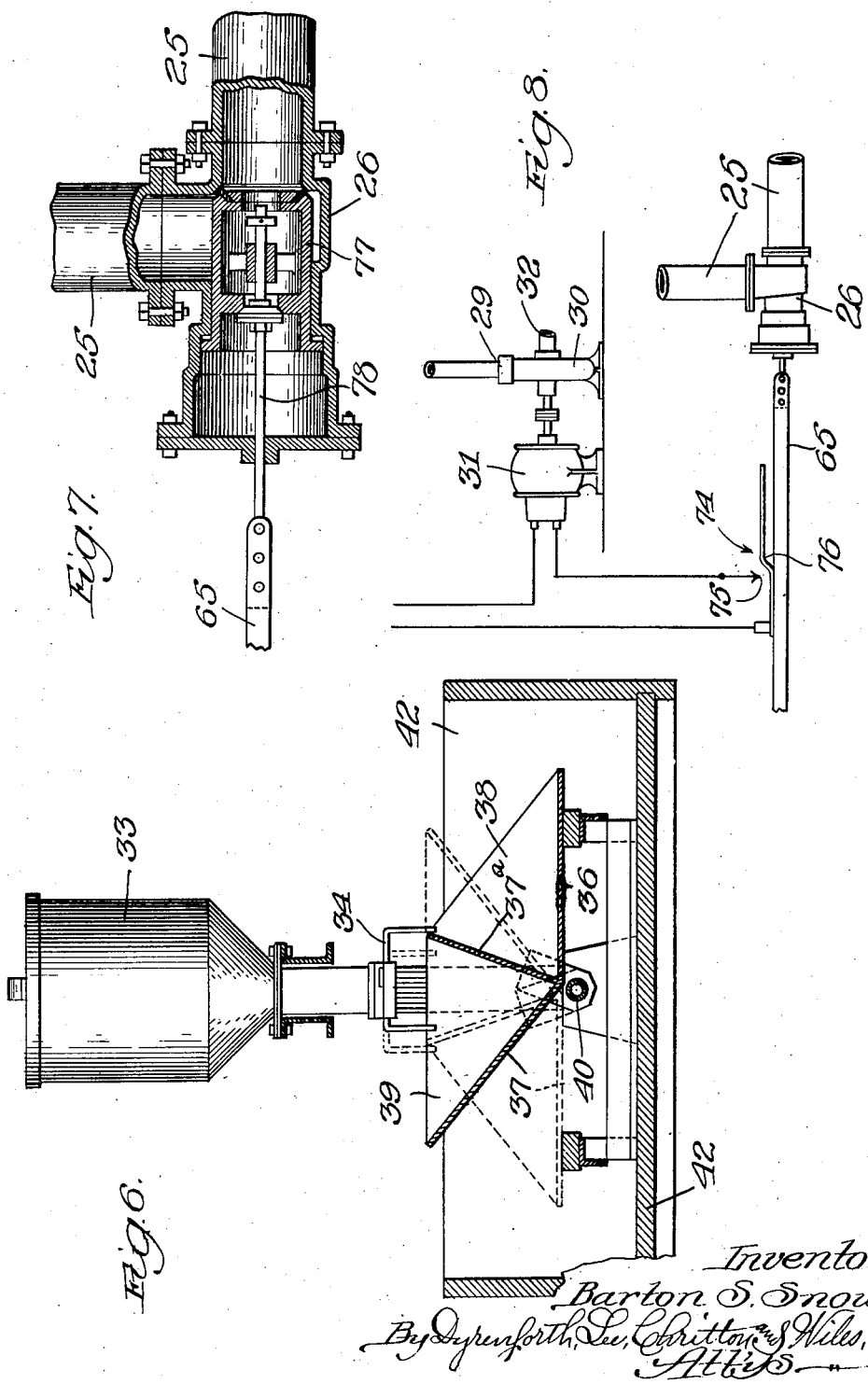

Patented June 28, 1932

1,864,866

UNITED STATES PATENT OFFICE

BARTON S. SNOW, OF WHEATON, ILLINOIS, ASSIGNOR TO T. W. SNOW CONSTRUCTION CO., OF CHICAGO, ILLINOIS, A CORPORATION OF ILLINOIS

WATER TREATING AND STORAGE APPARATUS

Application filed April 24, 1929. Serial No. 357,858.

My invention relates generally, as to one phase thereof, to the chemical treatment of water to render it "soft" or clarify it, as for example to better it for use in boilers; and as to another phase thereof to such treatment and the storage of the treated water particularly for the supplying of water to locomotive tenders.

One of my objects is to increase the efficiency of water treating apparatus particularly with the view of obtaining the maximum output of treated water for a given size of apparatus.

Another object is to provide a construction of water treating apparatus which may be used for charging treated-water storage tanks as for example and more particularly those used for the storing of water alongside railway tracks for supplying the tenders of locomotives, regardless of the height of the storage tanks within the ranges met in practice, without possibility of overflowing the storage tanks.

Another object is to provide apparatus which under continuous operation will deliver clear treated water.

Another object is to provide for the rapid and effective settling of the solid matter, commonly designated "floc", which is produced in the operation of chemically treating the water, to render the treated water in clarified condition.

Another object is to provide for the relatively violet agitation of the water and chemical for treating it and the abrupt discontinuation of the movement of the water produced by such agitation to reduce, to the minimum, such disturbance of the water as will prevent settling therefrom of the "floc".

Another object is to provide means which will be effective, in the introduction of water into a receptacle, such as a railway tank, to cause the water to flow into the tank with the minimum disturbance of the water therein.

Another object is to provide in a water treating apparatus for the automatic control of the chemical-solution-supplying means responsive to the supplying of water to be treated whereby the chemical solution will be supplied only as and when water for treatment is supplied; and other objects as will be manifest from the following description.

Referring to the accompanying drawings:

Figure 1 is a view in side elevation of a a water treating and storage apparatus embodying my invention.

Figure 2 is a view in vertical sectional elevation of the water-treating unit of the apparatus of Fig. 1.

Figure 3 is a plan sectional view taken at the line 3 on Fig. 2 and viewed in the direction of the arrow.

Figure 4 is a plan sectional view taken at the line 4 on Fig. 2 and viewed in the direction of the arrow.

Figure 4ª is an enlarged plan section of the discharge nozzle at which the raw water and the chemical solution for treating it is discharged into the treating chamber of the apparatus of Fig. 2, the section being taken at the line 4ª on Fig. 2 and viewed in the direction of the arrow.

Figure 5 is a view in vertical sectional elevation of the storage tank unit of Fig. 1.

Figure 6 is an enlarged view in vertical sectional elevation of the chemical-proportioning means, the section being taken at the line 6 on Fig. 4 and viewed in the direction of the arrow.

Figure 7 is a longitudinal sectional view of the valved portion of the pipe through which the raw water is supplied to the water-treating apparatus; and Figure 8, a view, somewhat in the nature of a diagram, showing mechanism by which the supplying of the chemical solution to the water-treating chamber is controlled responsive to the supplying thereto of water to be treated.

The particular illustrated apparatus comprises a water-treating unit represented generally at 9 and a storage tank represented at 10 and into which the water treated in the unit 9 is discharged for withdrawal therefrom as desired, the tank 10 being shown as of a type suitable for the supplying of locomotive tenders positioned on a track such as that represented at 11 and alongside of which the tank is positioned.

Referring to the water-treating unit 9, it is shown as formed of a substantially cylindrical upright shell 12 containing, adjacent its lower end, a partition 13 of hollow general frusto-conical shape with its smaller end lowermost. Located in the shell 12 above the partition 13 is a partition 14 of the same general form as the partition 13. The lower open end of the partition 14 is connected with the upper end of a cylindrical tubular member 16, forming a sludge drum, concentrically disposed relative to the shell 12 and extending downwardly through the lower open end of the partition 13 and into communication with a pipe 17 containing a shut-off valve 18 and leading to any suitable point of discharge; in the construction shown, into a well 19 having a drain pipe 20.

The arrangement of the partitions 13 and 14 and the sludge drum 16 defines a compartment 21 within the shell which is closed at its bottom by the partition 13 and in which the chemical treatment of the water is effected as hereinafter described.

The compartment within the shell 12 and located above the compartment 21 is represented at 22 and is open at its lower end to the compartment 21 through openings 23 in the outer marginal edge portion of the partition 14 and shown as equidistantly spaced apart, these openings communicating with vertical ducts 24 extending upwardly into the compartment 22.

The water to be treated is supplied through a pipe 25 having a valve indicated at 26, the upper end of the pipe 25 extending through the partition 13 and into the compartment 21 with its terminal end in the form of a nozzle 27 disposd tangentially of the shell 12 adjacent the latter, whereby the discharge from the nozzle is tangential of the shell.

Extending through the outlet of the nozzle 27 and centrally thereof and in spaced relation to the wall of the nozzle, is a pipe 28 through which the chemical solution with which the water is to be treated is discharged into the compartment 21.

The pipe 28 leads from the discharge outlet 29 of a pump 30 shown as driven by an electric motor 31, the suction inlet of the pump being connected with a pipe 32 which leads to apparatus for producing the desired chemical solution and shown as located in the compartment 12ª provided in the shell 12 below the partition 13. The chemical solution producing apparatus shown is of the construction shown in my pending application for United States Letters Patent Serial No. 348,753 filed March 21, 1929, and as this particular apparatus forms no part of the present invention, a brief description thereof only will suffice. It comprises a storage hopper device 33 into which the chemical, or chemicals, desired to be introduced into the water, are located and from which the chemical, or chemicals, as the case may be, are fed, under the control of a proportioning slide device 34 into a tilting receptacle device 35 having a bottom portion formed of sections 36 and 37 disposed at an oblique angle to each other and a substantially centrally disposed partition 37ª dividing the space between the side walls of the device and its bottom walls 36 and 37 into two compartments 38 and 39, the device 35 being pivotally supported at 40 to adapt it to rock from the full line position shown in Fig. 6 to the dotted position therein shown, and vice versa, responsive to the charging of the chemical, or chemicals, and water into these compartments in succession, the slide member 34 extending into the path of movement of the partition 37ª of the device and being reciprocated responsive to the rocking movements of the device 35.

A pipe 41 in communication with a supply of water as hereinafter described, has its lower discharge outlet arranged directly above the pivot 40 of the device 35 whereby in one position of the device one of the compartments becomes charged with water causing the device to rock responsive to the weight of the water into a position in which the other compartment becomes positioned to receive the water and when charged with a certain amount thereof automatically causes the device 35 to rock in the opposite direction.

The device 35 is located within the receptacle 42 into which the contents of the compartments 38 and 39 alternately discharge, the pipe 32 opening into the bottom of this receptacle.

It may be here stated that the raw water discharging through the nozzle 27 and the chemical solution through the pipe 28 is caused to revolve or swirl within the compartment 21 in a clockwise direction setting up the revolution of all, or practically all, of the contents of this compartment, the contents revolving at the higher rate adjacent the inner surface of the outer side wall of this compartment, whereby thorough agitation of the water and chemicals is effected, the water thus introduced into the compartment 21 tending to exert a lifting action on the heavier chemical solution and ensuring complete dissolution of the chemicals.

It is intended that complete, or substantially complete, reaction of the chemicals on the water be concluded in the compartment 21 from which latter the treated water, together with the "floc" produced by the chemical treatment, under control as hereinafter stated, rises through the ducts 24 into the compartment 22 which forms a settling chamber, the provision of the substantially vertically disposed ducts 24 being of advantage as thereby the treated water enters the compartment 22 substantially vertically without swirling and so quietly that agitation of the contents of the compartment 22 is reduced to the minimum, ensuring the effective settling of the floc to the bottom of the compartment 22 and the provision of a substantially clear body of treated water at the top of this compartment.

In the particular arrangement shown, and as hereinafter more fully described, the water-treating unit operates intermittently and thus during the periods when no water is being supplied to the compartment 21, the "floc" therein settles to the bottom of this compartment and is retained therein for subsequent intermixture with the water and chemical introduced through the nozzle 27 and pipe 28 into the compartment 21 upon resuming the supplying of water and chemical to these parts, the "floc" which collects in the bottom of the compartment 21 in the preceding operation and which becomes mixed with the newly formed "floc", agglomerating with the latter to aid in the forming of relatively large bodies of "floc" which is desirable as settling of the "floc" in the compartment 22 and entering it from the compartment 21 through the ducts 24 is accelerated.

The outlet for the clarified treated water in the compartment 22 is located at the upper portion of this compartment and comprises, in the arrangement shown, a horizontal pipe 43 in the upper portion of the compartment, this pipe being closed at its ends and containing inlets 44 formed by partially cutting away the upper portion of the wall of this pipe, the pipe 43 being connected between its ends with a downtake pipe 45 through which the treated water is conducted to the desired location, the pipe 45 being shown as extending downwardly through the sludge drum 16.

The water for producing the chemical solution is shown as supplied from the body of treated water in compartment 22, the pipe 41 to this end opening at its upper end into the compartment 22 at the level of the openings 43 whereby the water for forming the chemical solution is caused to flow to the chemical-solution-producing device substantially simultaneously with the flow of treated water to the pipe 45.

Referring now to the storage tank 10, it comprises a tank proper 46 shown as supported on a suitable sub-structure 47, the pipe 45 extending upwardly through the bottom of the tank 46 and terminating at its outlet adjacent the lower end of the tank. The outlet end of this pipe is shown as upwardly and outwardly flaring as represented at 48 there being provided across the top of this outlet a deflector plate 49 spaced therefrom, the purpose of the construction just described being to reduce to the minimum disturbance of the contents of the tank 46 by the incoming water.

The tank 10 being provided for the supplying of locomotive tenders with treated water, is provided with a water-conducting pipe 50 located in the tank 46 and swiveled at its lower end, as represented at 51, to a pipe 52 into which it opens. The extremity of the pipe 50 is connected with a float 53 in the tank 46 which serves to maintain the inlet 54 of the pipe 50 at all times relatively close to the upper surface of the clear water in the tank 46.

The pipe 52 is equipped with any suitable valve mechanism for controlling the flow of the water therefrom, the valve-controlling means in the construction shown comprising a lever 55 having a pull cable 56 at one end and connected near its opposite end with a valve actuating rod 57 shown as extending downwardly through an upwardly extending projection 58 of the pipe 52.

The pipe 52 extends downwardly through the bottom of the tank 46 and cooperates with a spout 59 pivoted at 60 on a stationary part of the apparatus which permits the spout 59, through which the water is supplied to the locomotive tender, to be swung from the dotted position represented in Figs. 1 and 5, the position occupied by the spout when the apparatus is not in use, to the full line position shown in these figures, which is the position occupied by the spout when water is to be discharged into a tender.

The spout 59 is counterweighted in any desirable way, as for example through the medium of a cable 61 connected at one end with the outer end portion of the spout 59, extending between its ends over a pulley 62 mounted on a stationary support 63, and connected at its other end with a counterweight (not shown) which is slidable up and down in a stationary tube 64.

As will be understood from the foregoing description the water supplied to the tank 46 and to the chemical-solution-producing apparatus is that which overflows the compartment 22 into the inlets 44 at the upper end of the pipe 43, and into the pipe 41, due to the upward displacement of the water in compartment 22 by the water introduced into compartment 21, the inlets 44 being at least as high as the level of the water to be maintained in the tank 46, the feeding of the treated water to the tank 46 and to the chemical-solution-producing apparatus being by gravity.

Provision is made for controlling the inlet to the compartment 21 of raw water and chemical solution, responsive to changes in the water level in the tank 46 to the end that withdrawal of water from the tank 46, with the consequent lowering of the level of the water therein, will automatically condition the raw-water-supplying means and the chemical-solution-applying means for introducing raw water and chemical into the compartment 21 and by displacement of the treated water in compartment 22 refill the tank 46 to the desired predetermined level.

The means provided for the purpose just stated comprise the valve device 26 of any desirable construction for controlling the raw water supply, this valve being connected with an operating link 65 pivoted to one end of a bell crank 66 fulcrumed at 67 on a stationary member and pivotally connected at its other end 68 with a vertically disposed rod 69 slidable in a sleeve or casing 69ª and pivoted at its upper end, as represented at 70, to one end of a lever 71 pivotally supported between its ends, as indicated at 72 and provided at its other end with a float 73 located in the tank 46 and floating on the upper surface of the body of water therein. The parts are so constructed and arranged that when the level of the water in tank 46 extends to the desired height, as for example as shown in Fig. 5, the valve 26 will be in closed condition, but when water is withdrawn from the tank 46, thereby lowering the level therein, the valve 26 will automatically open and supply raw water to the compartment 21.

The means for controlling the supplying of chemical solution to the compartment 21 simultaneously with the supplying of raw water thereto comprises, in the particular arrangement shown, an electric switch represented at 74 and comprising a stationary contact shown diagrammatically at 75 in Fig. 8 and a movable contact shown diagrammatically at 76 in this figure and connected with the link 65.

The switch 74 is interposed in the circuit through which current is supplied to the motor 31 and the parts of the switch are so arranged that in the closed position of the valve 26 the switch 74 is open but when this valve is moved to open condition the switch 74 is closed for supplying current to the motor 31.

While the valve device 26 may be of any desirable form, it is preferred that it be of the construction shown in Fig. 7 which is the same as that disclosed in United States Letters Patent No. 1,583,427 granted to me on May 4, 1926. It will therefore be sufficient to state that the flow of water to the nozzle 27 is controlled by the lengthwise movement of the piston member represented at 77 which is controlled through the medium of a valve-equipped actuating rod 78 at which the connecting link 65 is connected with the valve device.

The storage tank 10 is provided with means for removing therefrom sediment which accumulates on the bottom of the tank proper 46, these means being shown as comprising a substantially horizontal pipe 79 pivotally connected at an elbow portion 80 thereof to extend slightly above the bottom of the tank proper 46 and adapting the pipe 79 to be swung in a horizontal plane, the underside of this pipe containing inlets 81 and the pivoting portion of this pipe communicating with the upper end of a sludge pipe 82 valved, as indicated at 83, and opening into the pipe 17 at an elbow 84 in the latter. Any suitable means may be provided for swinging the pipe 79 as through the medium of the handwheel-equipped staff indicated at 85.

While I have illustrated and described a particular construction embodying my invention, I do not wish to be understood as intending to limit it thereto as the same may be variously modified and altered without departing from the spirit of my invention; and as an instance of such a modification, the compartment for the chemical-solution-producing device, instead of being located below the treating-compartment 21, may be located above the outlet for the water in compartment 22 and, if desired, formed as an upward continuation of compartment 22, in which case the pump 30 would be omitted and the pipe through which the water would be supplied to the chemical-solution-producing device, would connect with the pipe 25 between the valve 26 and the nozzle 27 and the flow of chemical solution into compartment 21 would be by gravity.

What I claim as new, and desire to secure by Letters Patent, is:

1. Water-treating apparatus comprising a shell containing water-treating and settling compartments arranged one above the other and a third compartment below said water-treating and settling compartments, and chemical-solution-producing means located in said third compartment and in communication with said treating compartment.

2. Water-treating apparatus comprising a shell containing spaced apart portions defining a lower compartment and water-treating and settling compartments arranged one above the other, and chemical-solution-producing means in said lower compartment and in communication with said treating compartment.

3. Water-treating apparatus comprising a lower water-treating tank, means for introducing into said tank the water to be treated, an upper settling tank into which the treated water flows by displacement, said lower tank communicating with said upper tank through the bottom of the latter only closely adjacent the peripheral wall of said upper tank, and a pipe opening at its upper end into said upper tank at its central portion and extending downwardly through, but out of communication with, said lower tank and through which the sludge from said upper tank discharges.

4. Water-treating apparatus comprising a lower water-treating tank, means for introducing into said tank the water to be treated, an upper settling tank into which the treated water flows by displacement, and substantially vertical ducts located closely adjacent the peripheral walls of said tank and communicating at their lower ends with said lower tank and opening at their upper ends into said upper tank and through which the displacement above referred to occurs, said ducts being the sole means of communication between said lower and upper tanks and said upper tank having a sludge outlet adjacent its bottom.

BARTON S. SNOW.